United States Patent [19]

Maru

[11] Patent Number: 5,150,412
[45] Date of Patent: Sep. 22, 1992

[54] SECURITY MODULE FOR RADIO TELEPHONE

[75] Inventor: Tsuguo Maru, Tokyo, Japan

[73] Assignee: NEC Corporation, Tokyo, Japan

[21] Appl. No.: 692,419

[22] Filed: Apr. 29, 1991

[30] Foreign Application Priority Data

Apr. 28, 1990 [JP] Japan .................................. 2-114424

[51] Int. Cl.⁵ .............................................. H04L 9/00
[52] U.S. Cl. ............................................ 380/43; 380/3; 380/24; 380/23; 380/52
[58] Field of Search ...................... 380/3, 4, 23, 24, 25, 380/43, 52

[56] References Cited

U.S. PATENT DOCUMENTS

| | | | |
|---|---|---|---|
| 4,229,817 | 10/1980 | Morgan et al. | 380/43 |
| 4,555,591 | 11/1985 | Nash | 380/43 |
| 4,731,842 | 3/1988 | Smith | 380/24 |
| 4,965,828 | 10/1990 | Ergott, Jr. et al. | 380/4 |

*Primary Examiner*—Thomas H. Tarcza
*Assistant Examiner*—David Cain
*Attorney, Agent, or Firm*—Sughrue, Mion, Zinn, Macpeak & Seas

[57] ABSTRACT

A security module for a radio telephone prevents a KEY code stored in a non-volatile memory from being read out for illicit use. The security module deletes the KEY code stored in the memory when accessed from the outside. Hence, although a KEY code can be written to the memory or the operation of the memory can be tested from the outside, the KEY code is prevented from being read out by an unauthorized person.

12 Claims, 6 Drawing Sheets

SECURITY MODULE FOR RADIO TELEPHONE

BACKGROUND OF THE INVENTION

The present invention relates to a radio telephone and, more particularly, to a security module which protects a KEY code particular to a given radio telephone against illicit use.

Generally, a wired telephone has a channel fixed by a line and, is, therefore, used at a limited place and by a limited person or persons. On the other hand, a wireless or radio telephone is connected to a base station together with other numerous radio telephones by common radio communication media. It is likely, therefore, that an unauthorized person uses the radio telephone at an unexpected place. To eliminate such illicit use, it has been customary to assign a particular identification (ID) code to each radio telephone in order to determine whether or not a radio telephone of interest is authentic one. Specifically, a PROM storing a particular ID code is incorporated in each radio telephone, so that the ID code may be read out to see if the telephone of interest is acceptable.

A modern radio telephone, especially portable radio telephone, has a miniature configuration and cannot readily be designed such that the casing thereof is openable for loading a PROM. In light of this, a current trend is toward the use of an E$^2$PROM (electrically rewritable non-volatile ROM) in place of a PROM. Specifically, after an E$^2$PROM has been built in a radio telephone on the manufacturer's production line, an ID code or similar information is written to the E$^2$PROM from the outside. The ID code is usually written to the E$^2$PROM via a keypad provided on the handset of the telephone. Stated another way, the ID code stored in the E$^2$PROM can be changed on the keypad of the handset, as desired. It is likely, therefore, that once the ID code particular to a given radio telephone is disclosed, an unauthorized person writes it in another radio telephone and uses this telephone illicitly. Another conventional approach for authentication is to add a passsword before writing an ID code or to allow an ID code to be written only when a particular terminal is lowered to the ground level by a test link. However, even the password or the test link level cannot fully protect a radio telephone against illicit use since it is easy to clear.

Attempts have recently been made to store a KEY code in a radio telephone in addition to an ID code, so that communication may be implemented by a signal encrypted by the KEY code. Specifically, a radio telephone encrypts random data sent from a base station by a KEY code and then returns the resulted data to the base station. In response, the base station determiners whether or not the encrypted data accurately matches the ID code and, only if the former matches the latter, sets up call connection. This kind of scheme is disclosed in "SIS ADDENDUM TO NMT DOC 900-1 and 900-3", July 1988. Even when an unauthorized person happens to know an ID code and encrypted data by monitoring the radio channel with some device, the ID code cannot be used unless the person knows the KEY code.

However, despite the above-stated implementation, the memory storing the KEY code is accessible to read out the key code. In this sese, the protection using the KEY code is not meaningful.

SUMMARY OF THE INVENTION

It is therefore an object of the present invention to provide a security module for a radio telephone which prevents a KEY code stored therein from being read out from the outside.

It is another object of the present invention to provide a generally improved security module for a radio telephone.

A security module for use with a radio telephone and preventing a KEY code from being read out from the outside of the present invention comprises an electrically rewritable nonvolatile memory to which the key code is written, an encrypting circuit for encrypting data entered from the outside on the basis of the key code stored in the non-volatile memory and outputting the encrypted data, an interface for receiving data from the outside and outputting the encrypted data, and a control circuit for enabling the non-volatile memory to be accessed via an internal bus and an external bus and, when the non-volatile memory is accessed, deleting the KEY code.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
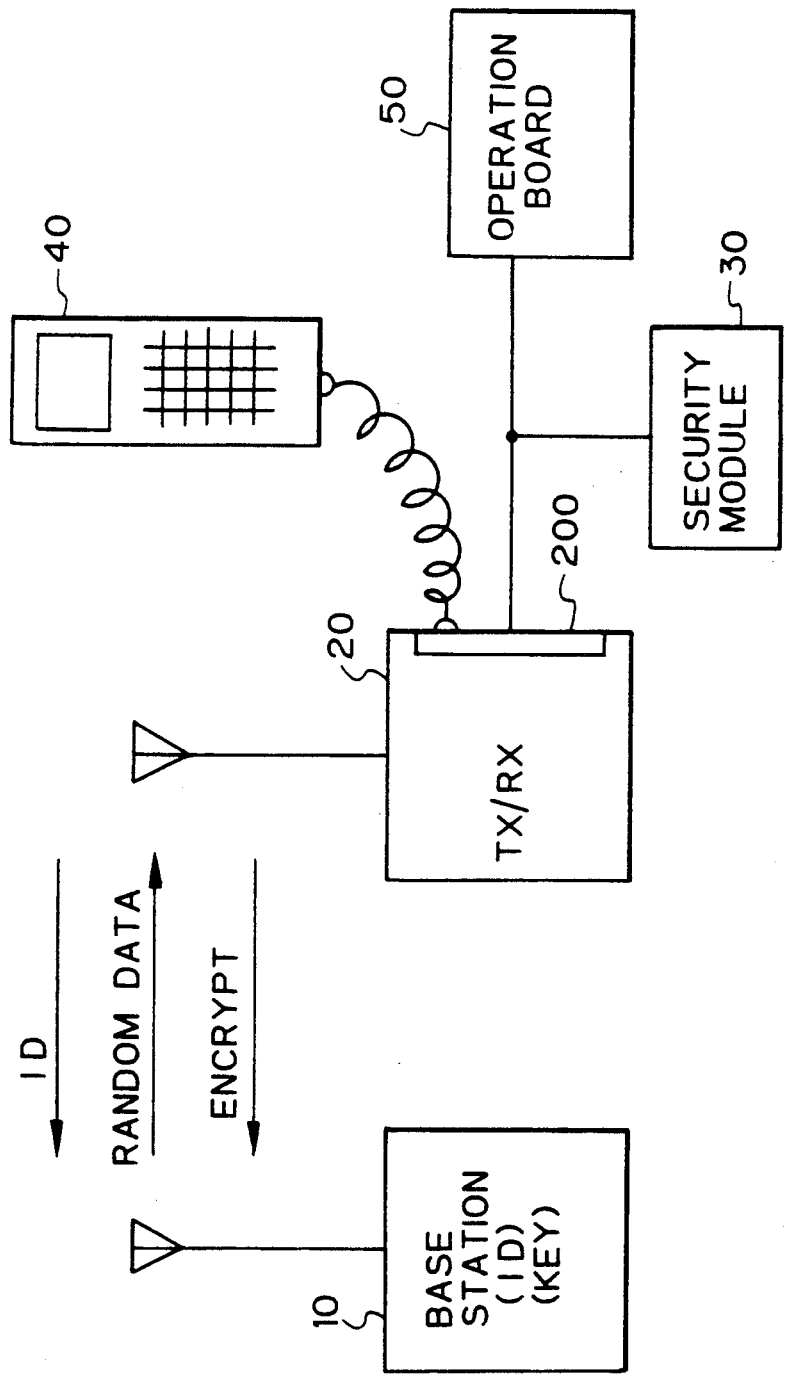
FIG. 1 is a block diagram schematically showing a specific arrangement of an automobile telephone implemented with a security module embodying the present invention.

Referring to FIG. 1 of the drawings, a specific arrangement of an automobile telephone implemented with a security module embodying the present invention is shown. As shown, the mobile telephone has a body or transmitter/receiver 20, a security module 30 embodying the present invention, a handset 40, and an operation board 50. The transmitter/receiver 20 is connected to a base station 10 by a radio channel. The security module 30 and handset 40 are connected to the transmitter/receiver 20 by an interface 200 which is built in the transmitter/receiver 20.

Figure 2:
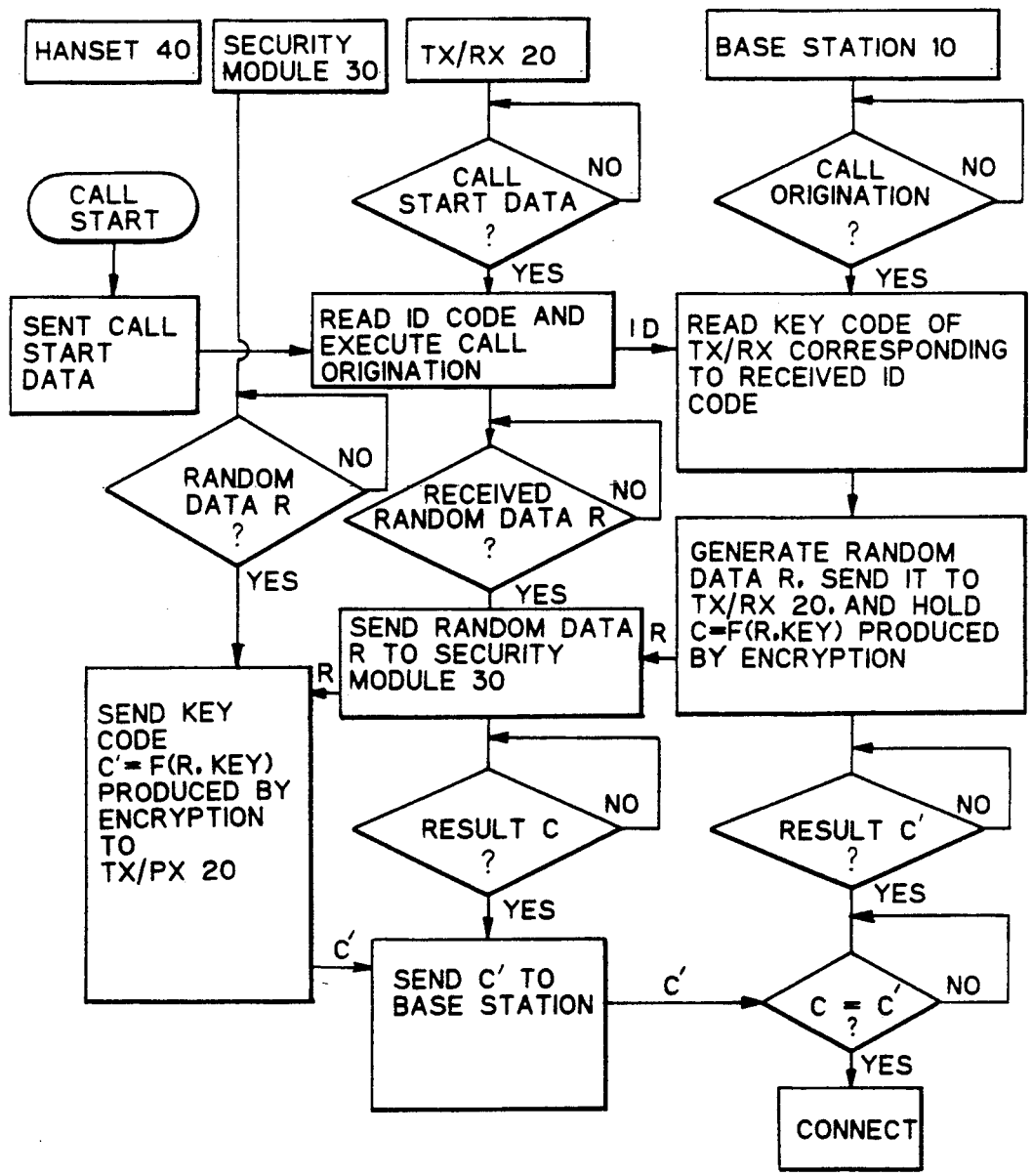
FIG. 2 is a flowchart demonstrating a specific call origination prosedure.

A reference will be made to FIG. 2 for describing a specific operation which such a mobile telephone performs in the event of call origination. As shown, call start data is fed from the handset 40 to the transmitter/receiver 20 via the interface 200. Storing an identification (ID) code therein, the transmitter/receiver 20 sends data including the ID code to the base station 10 over the radio channel. The base station 10 stores the ID code and a corresponding KEY code and, therefore, locates the mobile station which has requested call origination. Then, the base station 10 generates random data R and sends it to the transmitter/receiver 20. At the same time, the base station 10 holds the result of encryption (C=F(R, KEY)) executed by a one-directional function on the basis of the KEY code. On receiving the random data R, the transmitter/receiver 20 transfers it to the security module 30 via the interface 200. The security module 30 stores a KEY code and encrypts the random data by a one-directional function on the basis of the KEY code, delivering the result of encryption (C'=F(R, KEY)) to the transmitter/receiver 20. In response, the transmitter/receiver 20 sends the result C' to the base station 10 over the radio channel. Then, the base station 10 compares the received result C' with the stored result C and, only if they are identical, executes call connection over the radio channel.

Figure 3:
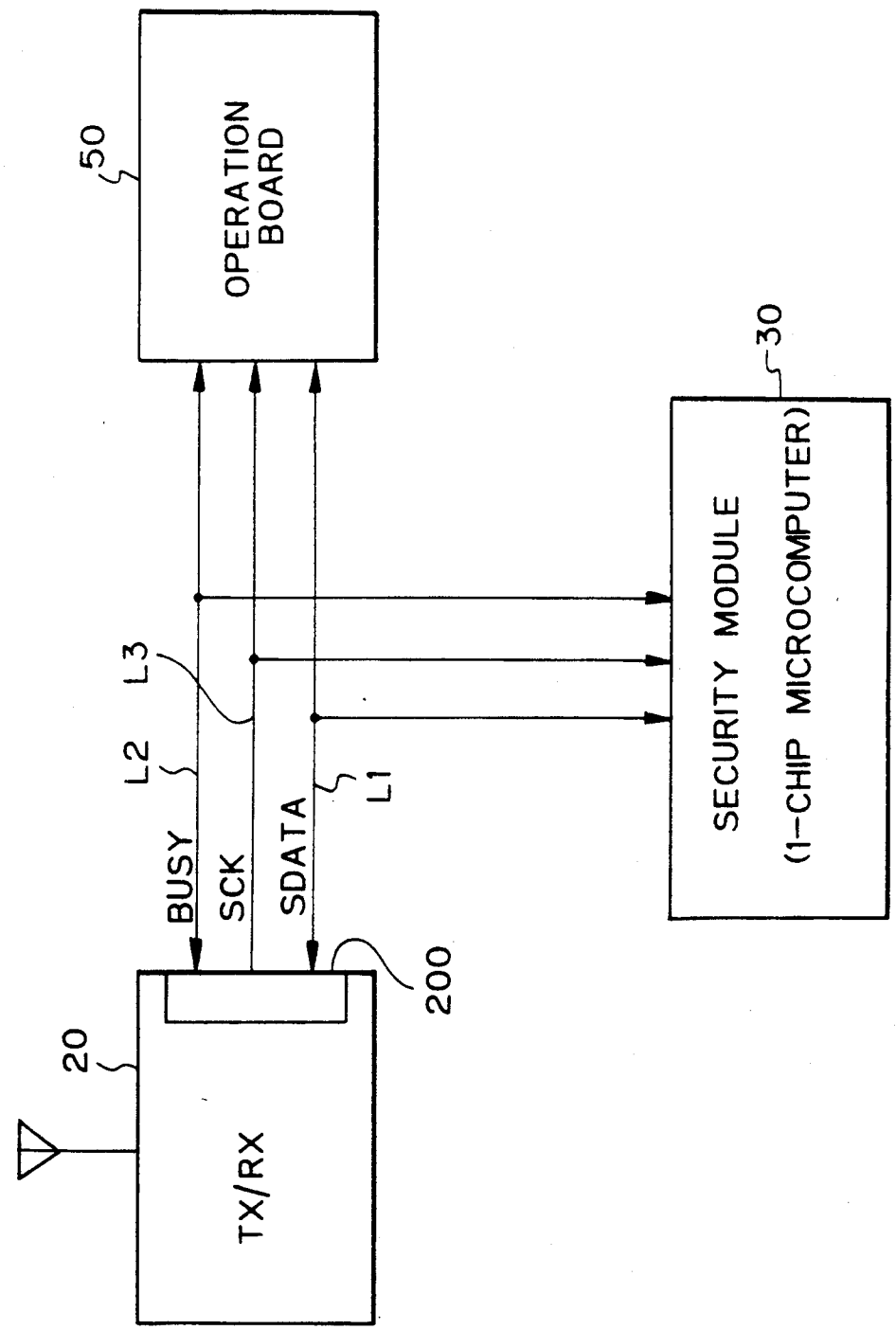
FIG. 3 is a block diagram schematically showing the connection of a transmitter/receiver, the security module, and an operation board.
Figure 4:
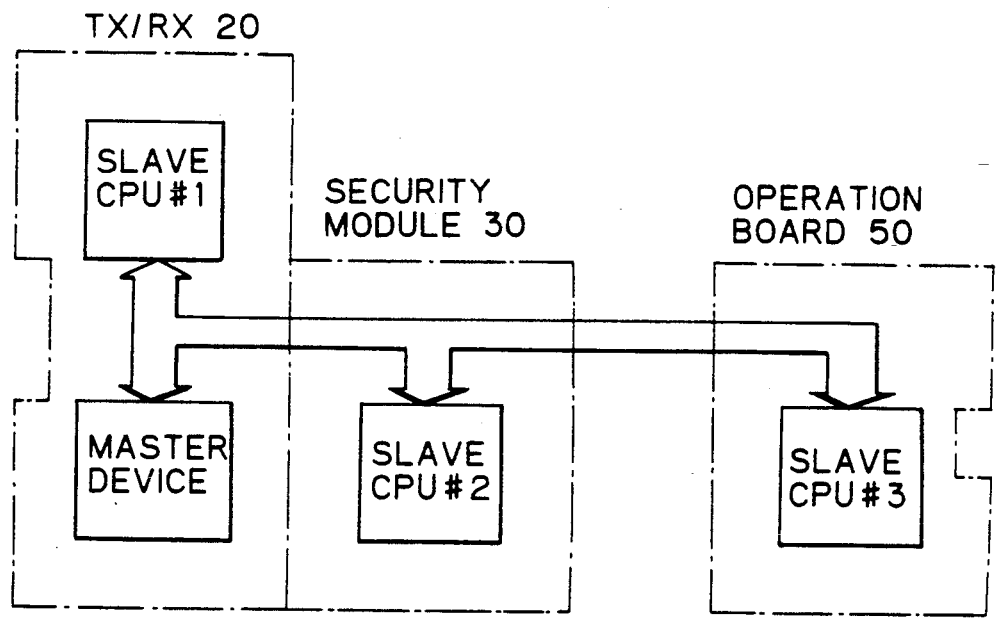
FIG. 4 is a schematic block diagram showing a serial interface applicable to the present invention.
Figure 5:
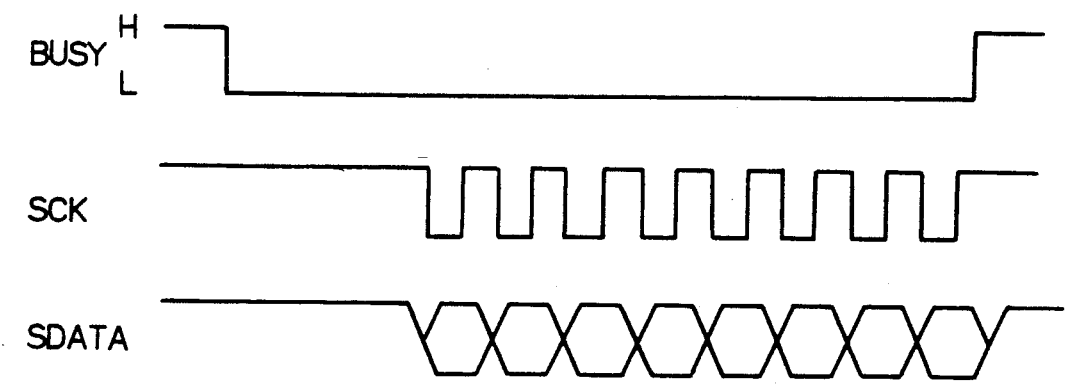
FIG. 5 is a timing chart showing a clock, a busy signal, and serial data.

FIG. 3 shows specific connection of the transmitter/receiver 20, operation board 50, and security module 30. In the figure, the transmitter/receiver 20 is connected to the operation board 50 and security module 30 via the interface 200 and by two bidirectional lines L1 and L2 and a single clock line L3. The bidirectional lines L1 and L2 are assigned to serial data SDATA and a busy signal BUSY, respectively, while the clock line L3 is assigned to a clock SCK. More specifically, as shown in FIG. 4, the lines L1 through L3 constituting a serial interface are connected to a master device and a slave CPU #1 built in the transmitter/receiver 20, a slave CPU #2 built in the security module 30, and a slave CPU #3 built in the operation board 50. FIG. 5 is a timing chart showing the serial data SDATA, busy signal BUSY, and clock SCK.

As shown in FIG. 3, the security module 30 is implemented as a 1-chip microcomputer having an interface therein, e.g. MC68HC11E9 available from Motorola. Since the security module 30 accommodates the three lines L1 through L3 in parallel, it can be added to an existing radio telephone without the latter being modified.

Upgoing data and downgoing data interchanged among the transmitter/receiver 20, security module 30 and operation board 50 will be described with reference to FIGS. 3 through 5. To begin with, downgoing data from the transmitter/receiver 20 to the operation board 50 of the security module 30 is implemented by the serial data which is synchronous to the clock SCK. Whether the downgoing data is meant for the operation board 50 or for the security module 30 is determined on the basis of an address heading the serial data SDATA. The BUSY line L3 indicates whether or not the interface 200 is occupied. By referencing this line L3 before the transmission of data, it is possible to prevent upgoing and downgoing data from conflicting with each other. Specifically, the busy signal BUSY is in a low level or "L" if the interface 200 is in use or in a high level or "H" if otherwise. Regarding upgoing data, the operation board 50 or the security module 30 checks the BUSY LINE L3 to see if the interface 200 is in use. If the interface line 200 is idle, the operation board 50 or the security module 30 uses the line L3. Then, the transmitter/receiver 20 sends the clock SCK to the operation board 50 or the security module 30. In response, the operation board 50 of the security module 30 sends serial data SDATA in synchronism with the clock. The transmitter/receiver 20 determines which of the operation board 50 and security module has sent the data by referencing the address that heads the serial data SDATA.

Figure 6:
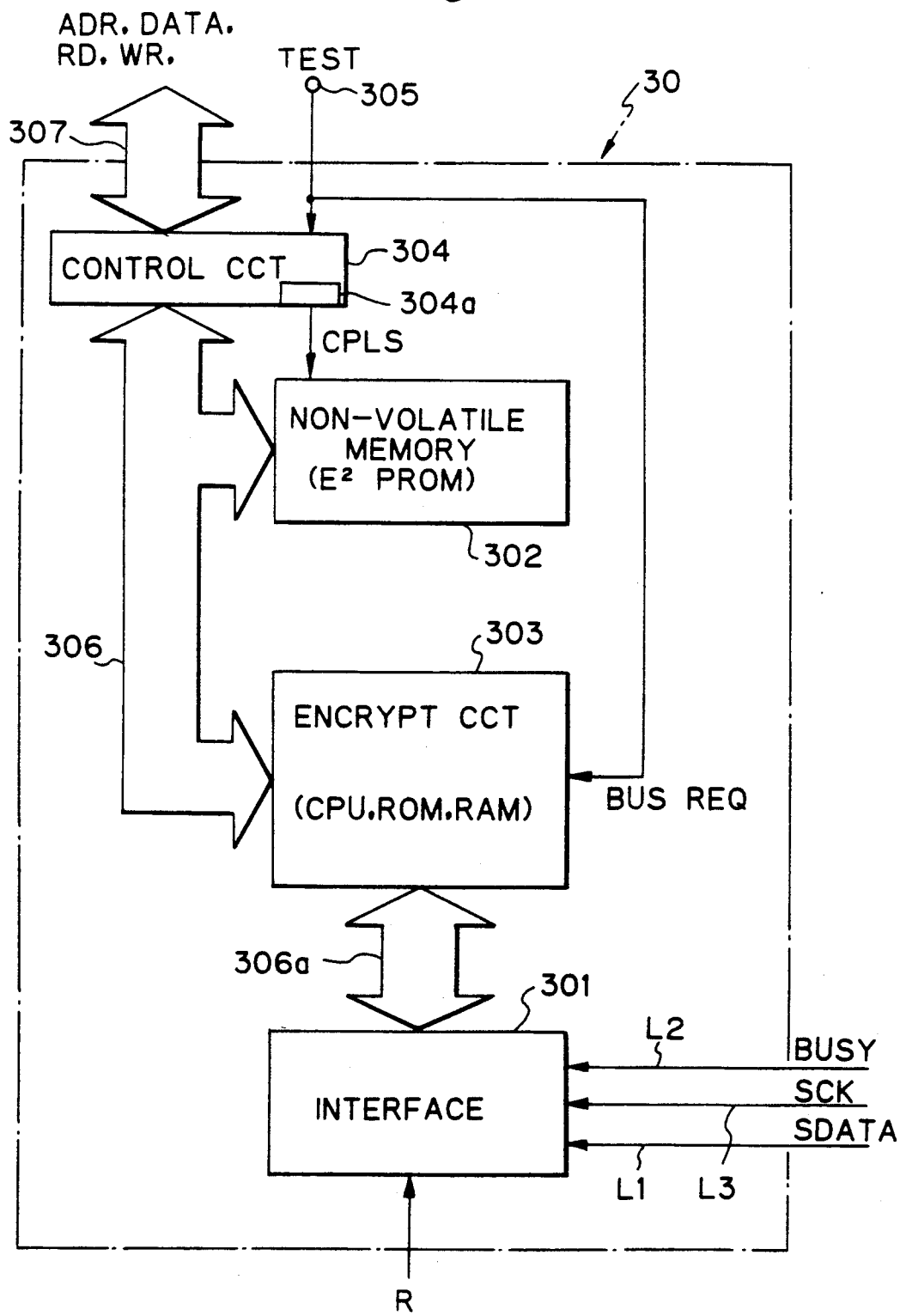
FIG. 6 is a block diagram schematically showing a 1-chip microcomputer constituting the security module.

FIG. 6 shows specific circuiry built in the 1-chip microcomputer constituting the security module 30. As shown, the microcomputer has a serial interface 301 to which the three lines L1 through L3 are connected. A non-volatile memory 302 which is an E²PROM stores the KEY code therein. An encrypting circuit 303 executes encryption by use of the KEY code and is made up of a CPU, ROM and RAM. A control circuit 304 has a test terminal 305 connecting to the non-volatile memory 302 and delivers a clear pulse CPLS to the memory 302 to delete the KEY code. Such components of the security module 30 are connected together by internal buses 306 and 306a.

When random data R is applied to the security module 30 via the serial interface 301, the encrypting circuit 303 encrypts it by the KEY code. In the illustrative embodiment, the encryption is implemented by a one-directional function, e.g.:

Encrypted data = (random data)$^{KEY1}$ (mod KEY2)

where KEY1 and KEY2 are representative of predetermined portions of the KEY code. For this kind of approach, a reference may be made to S. C. Pohlig and M. E. Hellman "An Improved Algorithm for Computing Logarithms over GF (p) and Its Cryptographic Significance", IEEE Transaction on Information Theory, Vol. IT-24, January 1978, pp. 106–110.

The data encrypted by the above procedure is sent out again via the serial interface circuit 301.

A prerequisite with the security module or 1-chip microcomputer 30 is that the operations of the non-volatile memory 302 and encrypting circuit 303 be tested by some method after the production. Nevertheless, the KEY code stored in the non-volatile memory 302 has to be prevented from being read out for authentication. The control circuit 304 is incorporated in the module 30 for meeting this requirement. Specifically, while the microcomputer is in an ordinary operation, the test terminal 305 remains inactive so that the internal bus 306 is isolated from the outside by the control circuit 304. In this condition, the encrypting circuit 303 and memory 302 are accessible in the microcomputer. When the test terminal 305 is rendered active for a testing purpose or in the event of unauthorized operation, the control circuit 304 connects the internal bus 306 and an external bus 307 so that the non-volatile memory 302 and encrypting circuit 303 become accessible via the external bus. However, a differentiating circuit 304a of the control circuit 304 feeds a clear pulse CPLS to the non-volatile memory 302 to thereby clear the content of the memory 302, i.e., the KEY code. As a result, although the memory 302 and encrypting circuit 303 may be tested thereafter, the KEY code has been deleted and, therefore, is not read out.

More specifically, when the test terminal 305 is brought to a high level, the control circuit 304 connects the external bus 307 to the internal bus 306 and at the same time provides a clear pulse CPLS to the memory 302 to erase the KEY code therein. The high level at the terminal 305 is also applied to the encrypting circuit 303 as a bus request, so that the encrypting circuit 303 abandons to seize the internal bus 306. Then, an external device (not shown) can access the memory 302 via buses 307 and 306 to exchange data, e.g., addresses ADR, a read signal RD and a write signal WR, with the memeory 302. When the write signal WR and an address ADR are applied to the memory 302 from the external device, data, such as a KEY code, is written into a memory location of memory 302 with is designated by the applied address. When the read signal RD and an address ADR are applied to the memory 302, data is read out of a memory location designated by the applied address. As the test terminal 305 turns to a low level, the internal bus 306 is fully isolated from the external bus 307 and the encrypting circuit 303 re-seizes the internal bus 306.

Alternatively, the KEY code may be written to the non-volatile memory 302 on a keypad provided on the handset 40 in the same manner as the ID code. When the KEY code is divided into two parts, it is possible to write one part in the memory 302 at the production stage, i.e., before shipment and to write the other part on the keypad at the dealer's place. Specifically, when one of the two parts of the KEY code is fed to the serial interface 301 at the manufacturer's stage, the encrypting circuit 303 writes it in the memory 302. When the other part of the KEY code is entered on the handset 40, it is transferred to the transmitter/receiver and, on the basis of data which will be returned from the transmitter/receiver 20, the encrypting circuit 303 writes it in the memory 302. Such a procedure will further enhance protection against illicit use.

Figure 7:
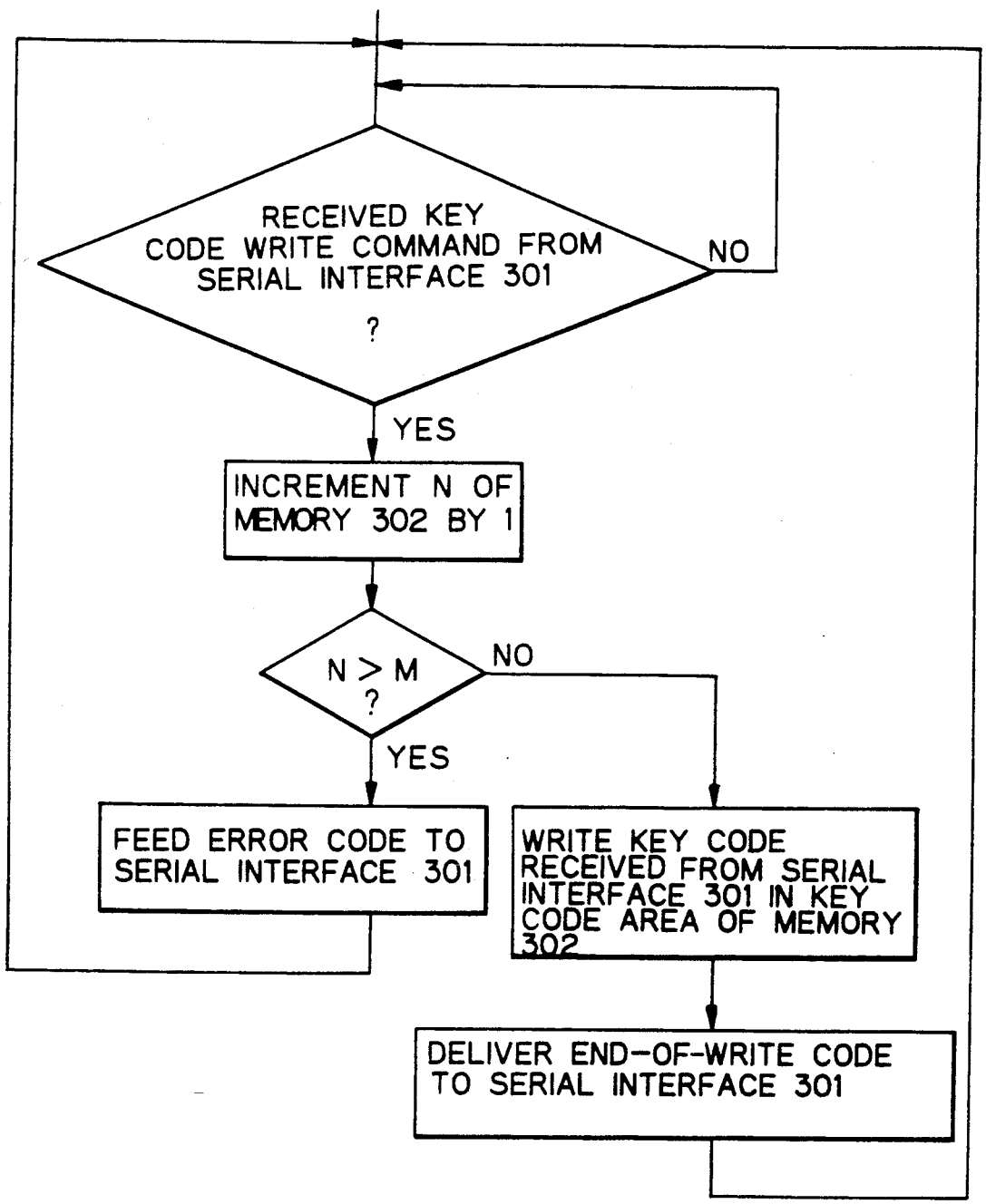
FIG. 7 is a flowchart demonstrating a specific operation of a modified form of the construction shown in FIG. 6.

Further, the encrypting circuit 303 may be provided with a counter for counting the number of times that the operation for writing the KEY code in the non-volatile memory 302 is performed. In this case, when such an operation has been repeated a predetermined number of times, any further writing operation is inhibited to prevent the KEY code from being rewritten afterwards. Specifically, as shown in FIG. 7, when the encrypting circuit 303 receives a write command via the serial interface, it increments the counter, i.e., the number of times N that the writing operation is performed by 1. When the number N exceeds a predetermined reference number M, the encrypting circuit 303 delivers an error code to the serial interface. So long as the number N is smaller than the reference number M, the encrypting ciruit writes the KEY code received via the serial interface in the memory and then feeds an end-of-write code to the serial interface.

While the present invention has been described in relation to the combination of a transmitter/receiver and a handset, it is similarly applicable to a portable telephone or similar radio equipment.

In summary, the present invention provides a security module for a radio telephone which deletes a KEY code stored in a non-volatile memory when accessed from the outside. Hence, although a KEY code can be written to the memory or the operation of the memory can be tested from the outside, the KEY code is prevented from being read out by an unauthorized person. This implements communication using data which is encrypted by a KEY code, while eliminating illicit communication using the KEY code.

The security module is implemented as a 1-chip microcomputer and uses an interface built in the transmitter/receiver of the telephone. The security module is, therefore, applicable to an existing radio telephone without the latter being modified and is small size and low cost.

Various modifications will become possible for those skilled in the art after receiving the teachings of the present disclosure without departing from the scope thereof.

What is claimed is:

1. A security module for use with a radio telephone and preventing a KEY code from being read out from outside the security module comprising:
   an electrically rewritable non-volatile memory to which the KEY code is written;
   encrypting means for encrypting data entered from outside the security module on the basis of the KEY code stored in said non-volatile memory, and outputting said encrypted data;
   interface means for receiving data from outside the security module and outputting said encrypted data; and
   control means for enabling said non-volatile memory to be accessed via an internal bus and an external bus and, when said non-volatile memory is accessed, deleting the KEY code.

2. A security module as claimed in claim 1, wherein said non-volatile memory, said encrypting means, said interface means and said control means are implemented as a 1-chip microcomputer.

3. A security module as claimed in claim 1, said non-volatile memory comprises an $E^2ROM$.

4. A security module as claimed in claim 1, wherein said encrypting means comprises a CPU, a ROM, and a RAM.

5. A security module as claimed in claim 1, wherein said interface means comprises a serial interface circuit.

6. A security module as claimed in claim 1, wherein said control means comprises a test terminal which isolates said internal bus from said external bus when inactive or connects said internal bus and said external bus to allow access to occur when active, and a differentiating circuit for outputting a clear pulse for deleting said KEY code.

7. A device adapted to be connected to a communication apparatus, comprising:
   means for storing a KEY code;
   means for enciphering input data using the stored KEY code to produce enciphered data;
   means for interchanging said input and enciphered data with said communication device; and
   means for erasing said KEY code from said storing means in response to access to said storing means from outside the security module.

8. A device as claimed in claim 7, further comprising means for interfacing said storing and enciphering means, said interfacing means being isolated from outside the security module.

9. A device as claimed in claim 7, wherein said interchanging means comprises a serial bus.

10. An apparatus comprising:
    means for sending a call-up signal with an identification (ID) code to a remote station;
    means for receiving random data from said remote station;
    means for storing a first KEY code;
    means for encrypting the received random data with the stored first KEY code to produce a first encrypted data;
    means for transmitting said first encrypted data to said remote station; and
    means for erasing said first KEY code from said storing means when said storing means is accessed from outside the security module.

11. An apparatus as claimed in claim 10, further comprising at said remote station:
  means for receiving said call-up signal and the transmitted first encrypted data;
  means responsive to the received call-up signal for generating said random data based on said ID code;
  means for transmitting the generated random data;
  means for encrypting the generated random data with a second KEY code corresponding to said ID code to produce a second encrypted data; and
  means for comparing the received first encrypted data with said second encrypted data.

12. A method of preventing a KEY code in a memory from being stolen, comprising the steps of:
  storing said KEY code in said memory;
  incorporating said memory in a module;
  encrypting data in said module by using said KEY code; and
  erasing said KEY code from said memory when said memory is accessed from outside of said module.

* * * * *